United States Patent [19]

Shimizu et al.

[11] 4,393,305
[45] Jul. 12, 1983

[54] METHOD OF TUBE WALL THICKNESS MEASUREMENT

[75] Inventors: Masami Shimizu; Asao Monno, both of Kawasaki, Japan

[73] Assignee: Fuji Electric Company, Ltd., Japan

[21] Appl. No.: 190,800

[22] Filed: Sep. 25, 1980

[30] Foreign Application Priority Data

Sep. 26, 1979 [JP] Japan .............................. 54-122642

[51] Int. Cl.³ .......................................... G01N 23/00
[52] U.S. Cl. .................................... 250/358.1; 378/59
[58] Field of Search ............... 250/308, 358 R, 358 P, 250/359, 360; 378/59

[56] References Cited

U.S. PATENT DOCUMENTS 3,109,095 10/1963 Van Horne ..................... 250/358 P
4,038,550 7/1977 Wassen et al. .
4,187,425 2/1980 Thompson ...................... 250/358 P

FOREIGN PATENT DOCUMENTS

53-77552 7/1978 Japan .

Primary Examiner—Alfred E. Smith
Assistant Examiner—Janice A. Howell
Attorney, Agent, or Firm—Brumbaugh, Graves, Donohue & Raymond

[57] ABSTRACT

A method and apparatus for measuring the thickness of a tubular wall includes a measurement of the intensities of the radiation beams passing through the wall and processing of the measured values in accordance with the method of least squares.

10 Claims, 10 Drawing Figures

METHOD OF TUBE WALL THICKNESS MEASUREMENT

BACKGROUND OF THE INVENTION

This invention relates to a method and apparatus to gauge the wall thickness of a tubular object by simultaneously measuring the thicknesses at several points on the periphery of a tubular object, in a non-contacting manner.

Generally, in manufacturing tubing such as seamless steel tubes, it is necessary to accurately gauge wall thicknesses or, inner and outer diameters, both in the case of a cold manufacturing process, where the tubing is at ambient temperature, and in the case of a hot manufacturing process, where the tubing has a temperature of about 1000° C. The requirements for such a method of measurements are that it take place without contact of the tubing, that it be conducted under high temperature conditions of about 1000° C., that the measurement have an accuracy of about 200 μm±50 μfor a wall thickness of about 5–40 mm, and that it be performed rapidly. A rapid process is necessary in order to detect frequent variations of the wall thickness which occur along the periphery and length of the tubing.

Figures 1, 2, 4, 5, 6:
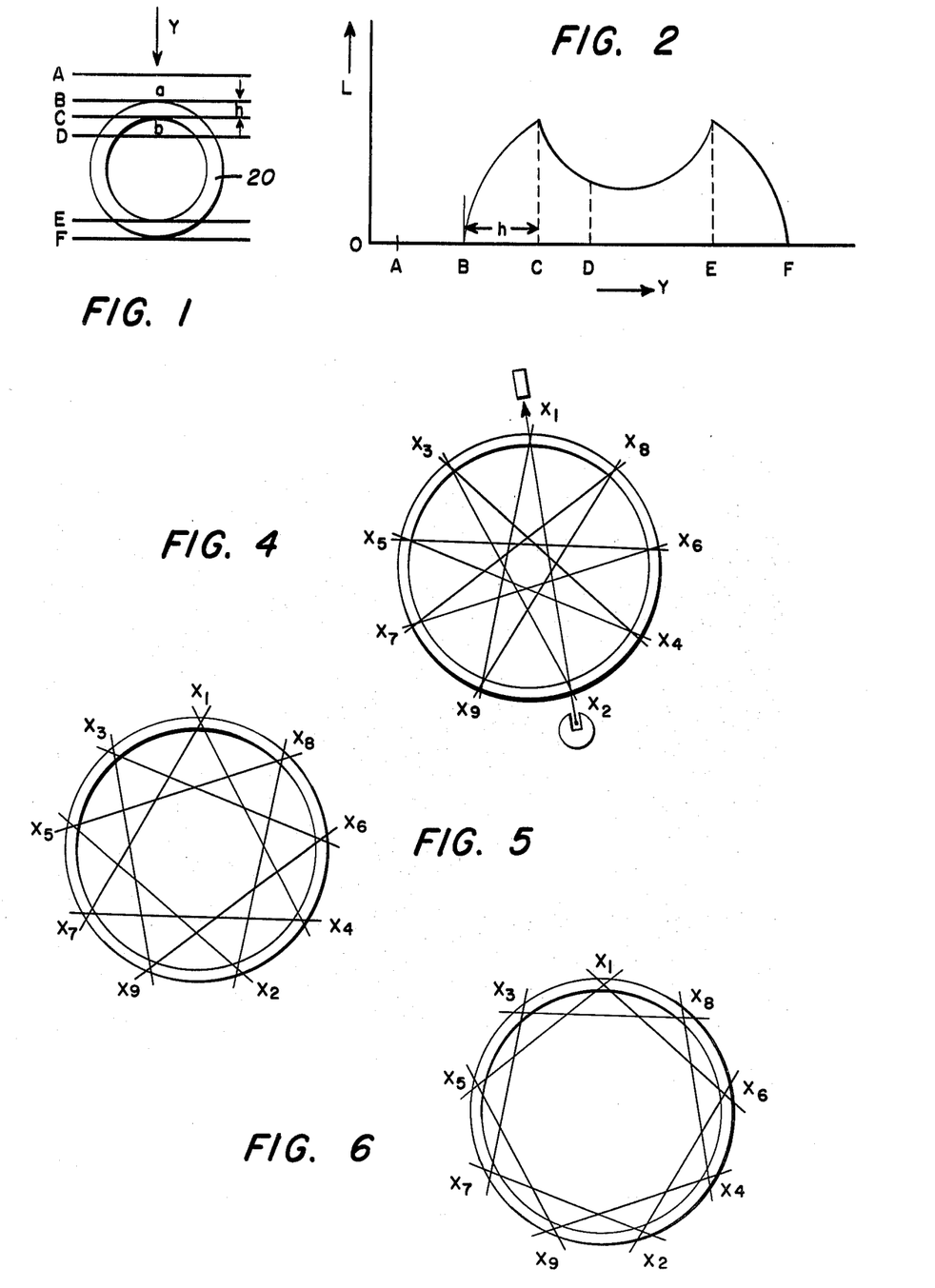
FIG. 1 is a schematic sectional view of a tube with lines showing radiation beam scanning.
FIG. 2 is a diagram showing the measured dimensions (in ordinate) at various measuring positions of the radiation beam (in abscissa) for the method illustrated in FIG. 1.
FIGS. 4, 5, and 6 are schematic illustrations showing three embodiments of the invention, where the number n of measuring points is equal to nine.

One method which has been heretofore proposed is illustrated in FIGS. 1 and 2. As seen in FIG. 1, the wall thickness of tubing 20 is measured along the parallel lines A, B, C, and D, where the line B contacts with the outer periphery of the tubing at a point a. Thus, the measured dimension L of wall thickness varies as shown in FIG. 2. Taken along the line A, which does not cross the tubing periphery, the dimension L is zero. Along the line B, which just contacts with the outer periphery of tubing 20, the dimension L is also zero. Along the line C, which contacts with the inner periphery of tubing 20, the dimension L reaches its maximum. Along the line D, where the dimension L is given by the sum of widths of both left and right wall portions, it is far smaller than the value taken along the line C. If the measurement takes place with the position (of the line) shifting in the direction of the arrow Y, the value of L follows the curve as shown in FIG. 2.

The wall thickness of tubing 20 is therefore given by a distance h in the direction of arrow Y between a point B of rising in front of that curve and a point C where the value of L reaches its maximum (FIG. 2). A measuring instrument comprising a radiation source and a radiation detector is used (not shown) to obtain this curve. The source and detector are placed on the line A, on both sides of the tubing, separated from each other by a distance greater than the diameter of tubing 20. This measuring instrument is moved in the direction of arrow Y, from a position on the line A through the positions of the lines B, C, and D and so on, while its output indicates the varying value of L. The distance of movement in the Y direction, between the point where its output just begins to rise and the point where it reaches the maximum, is the wall thickness.

The method just described can achieve the measurement without touching the measured object. However, it does not afford a high degree of accuracy in measurement, since an error in defining the position of the radiation beam causes an error in the measured value of wall thickness. It has another drawback in that rapid measurement is not readily achievable. Since a gamma-ray source is used for the radiation when measuring the thickness of a steel pipe wall a lengthy operation for measurement is required as the source is massive and cannot be quickly moved for radiation beam scanning.

In order to eliminate the drawbacks of this known measuring method, it is desired to create a new method for wall method thickness measurement which operates in a non-touching manner affording higher accuracy and rapid performance.

SUMMARY OF THE INVENTION

In accordance with the invention, there are provided at least three measuring points arranged along a tube wall circle and radiation beams oriented in plural directions where every radiation beam passes through two of the measuring points and where every measuring point is passed by at least two radiation beams different in direction. By measuring the intensities of radiation transmitted through the measuring points of the tube wall and then processing these measured values the wall thicknesses at the measuring points can be readily determined.

Another feature of the invention is the application of the method of least squares. The measured values generated by the invention can be analyzed in accordance with the method of least squares, yielding results which are highly accurate.

For a better understanding of the present invention together with other and further objects reference is made to the following description taken in conjunction with the accompanying drawings, and its scope will be pointed out in appended claims.

DESCRIPTION OF THE PREFERRED EMBODIMENT

Figure 3:
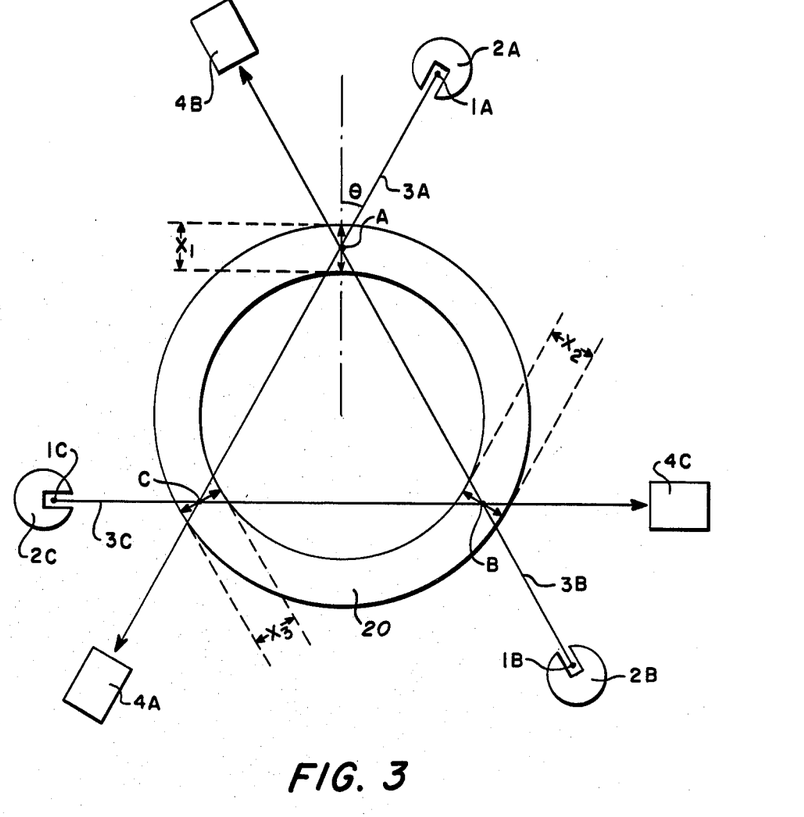
FIG. 3 is a schematic illustration of an embodiment of the invention showing a cross-section of a tube 20.

FIG. 3 illustrates a schematic view of one embodiment of the invention and shows a cross-section of a tube 20. This embodiment gauges wall thicknesses $x_1$, $x_2$, and $x_3$ at respective measuring points A, B and C, which divide the tube wall perimeter into three equal parts.

The device has three measuring systems corresponding to the points A, B, and C. Each measuring system comprises a radiation source (1A, 1B, or 1C), a source assembly (2A, 2B, or 2C) which directs a radiation beam (3A, 3B, or 3C) in a fixed direction, and a detector (4A, 4B, or 4C) to measure the intensity of the radiation beam transmitted through the wall of the tube 20. Here, the letters A, B, and C annexed to the reference numerals represent the parts of the three respective systems. Those letters will be omitted hereinafter for simplicity unless specifically required. Reference characters $I_1$, $I_2$, and $I_3$ are used to denote the outputs of the respective detectors 4A, 4B, and 4C when the radiation beams reach them through the tube wall, while $I_{10}$, $I_{20}$, and $I_{30}$ denote the outputs of the respective detectors in the absence of the tube body (i.e., where the radiation beams reach them directly). Disposition of the measuring systems is such as is shown in FIG. 3, where each radiation beam passes two measuring points and each measuring point is passed by two beams, which in turn pass through two other measuring points, respectively.

Figure 3A:
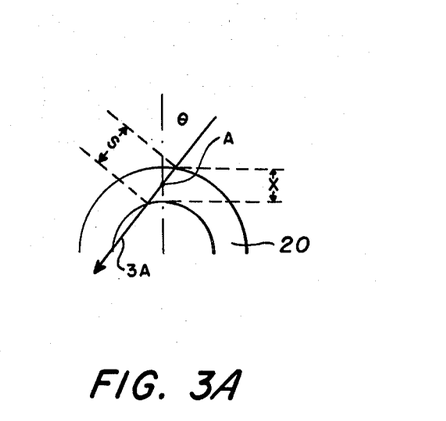
FIG. 3A is a diagram of the reference characters in a portion where the radiation beam passes through the tube wall of FIG. 3.

From a fundamental formula in radiation transmission thickness measurement, the following equations hold, to give the relation between the detector outputs and the measured thicknesses.

$$I_1 = I_{10} \exp\{-\mu k(x_1+x_2)\} \quad (1)$$

$$I_2 = I_{20} \exp\{-\mu k(x_2+x_3)\} \quad (2)$$

$$I_3 = I_{30} \exp\{-\mu k(x_3+x_1)\} \quad (3)$$

where $\mu$ denotes an absorption coefficient of the radiation in the tube material, and k denotes a value of an actual transit path length S of radiation beam across the tube wall through a measuring point (cf. FIG. 3A) divided by a wall thickness x at that point.

If the radiation beam runs in a radial direction with respect to the tube, i.e., if the angle $\theta$ in FIG. 3 is zero, the value of k is 1. Provided that the number of measuring points and the beam thickness and direction of radiation are adequately chosen with regard to the shape of the tube, the value of k can be chosen to have minimal influence in spite of random fluctuations of the tube wall thickness.

A solution of the simultaneous equations (1) through (3) can be given by $$x_1 = \frac{1}{\mu k} \cdot \frac{1}{2} \ln\left(\frac{I_{10}}{I_1} \cdot \frac{I_2}{I_{20}} \cdot \frac{I_{30}}{I_3}\right) \quad (4)$$

$$x_2 = \frac{1}{\mu k} \cdot \frac{1}{2} \ln\left(\frac{I_{20}}{I_2} \cdot \frac{I_3}{I_{30}} \cdot \frac{I_{10}}{I_1}\right) \quad (5)$$

$$x_3 = \frac{1}{\mu k} \cdot \frac{1}{2} \ln\left(\frac{I_{30}}{I_3} \cdot \frac{I_1}{I_{10}} \cdot \frac{I_{20}}{I_2}\right) \quad (6)$$

The wall thicknesses $x_1$, $x_2$, and $x_3$ can therefore be determined from the values of the detector outputs $I_{10}$, $I_1$, $I_{20}$, $I_2$, $I_{30}$, and $I_3$ and the constants $\mu$ and k.

Though the above embodiments illustrates the case where there are three measuring points, the technique can be adapted for any number n measuring points. Therefore designating $x_1, x_2, \ldots, x_n$ as wall thicknesses at the respective measuring points, the following relations (simultaneous equations) hold, which are obtained by logarithmic transformation of equations corresponding to the above equations (1) through (3).

$$\left.\begin{array}{ll} x_1 + x_2 = b_1, & b_1 = \frac{1}{\mu k}\ln\frac{I_{10}}{I_1} \\ x_2 + x_3 = b_2, & b_2 = \frac{1}{\mu k}\ln\frac{I_{20}}{I_2} \\ x_3 + x_4 = b_3, & b_3 = \frac{1}{\mu k}\ln\frac{I_{30}}{I_3} \\ - & - \\ x_{n-1} + x_n = b_{n-1}, & b_{n-1} = \frac{1}{\mu k}\ln\frac{I_{(n-1)o}}{I_{(n-1)}} \\ x_n + x_1 = b_n, & b_n = \frac{1}{\mu k}\ln\frac{I_{no}}{I_n} \end{array}\right\} \quad (7)$$

Using matrixes, the simultaneous equations (7) will be shown as below:

$$\begin{pmatrix} 1 & 1 & 0 & - & - & - & - & - & 0 \\ 0 & 1 & 1 & 0 & - & - & - & - & 0 \\ 0 & 0 & 1 & 1 & 0 & - & - & - & 0 \\ 0 & 0 & 0 & 1 & 1 & 0 & - & - & 0 \\ - & - & - & - & - & - & - & - & - \\ 0 & 0 & - & - & - & - & 0 & 1 & 1 \\ 1 & 0 & - & - & - & - & 0 & 0 & 1 \end{pmatrix} \begin{pmatrix} x_1 \\ x_2 \\ x_3 \\ x_4 \\ - \\ x_{n-1} \\ x_n \end{pmatrix} = \begin{pmatrix} b_1 \\ b_2 \\ b_3 \\ b_4 \\ - \\ b_{n-1} \\ b_n \end{pmatrix} \quad (7a)$$

In the above, the number n is to be odd.

FIG. 4 is a schematic illustration showing an embodiment where n=9. There, the simultaneous equations determining wall thicknesses $x_1, x_2, \ldots, x_9$ are, from above, represented by $$\begin{pmatrix} 1 & 1 & 0 & 0 & 0 & 0 & 0 & 0 & 0 \\ 0 & 1 & 1 & 0 & 0 & 0 & 0 & 0 & 0 \\ 0 & 0 & 1 & 1 & 0 & 0 & 0 & 0 & 0 \\ 0 & 0 & 0 & 1 & 1 & 0 & 0 & 0 & 0 \\ 0 & 0 & 0 & 0 & 1 & 1 & 0 & 0 & 0 \\ 0 & 0 & 0 & 0 & 0 & 1 & 1 & 0 & 0 \\ 0 & 0 & 0 & 0 & 0 & 0 & 1 & 1 & 0 \\ 0 & 0 & 0 & 0 & 0 & 0 & 0 & 1 & 1 \\ 1 & 0 & 0 & 0 & 0 & 0 & 0 & 0 & 1 \end{pmatrix} \begin{pmatrix} x_1 \\ x_2 \\ x_3 \\ x_4 \\ x_5 \\ x_6 \\ x_7 \\ x_8 \\ x_9 \end{pmatrix} = \begin{pmatrix} b_1 \\ b_2 \\ b_3 \\ b_4 \\ b_5 \\ b_6 \\ b_7 \\ b_8 \\ b_9 \end{pmatrix} \quad (8)$$

FIG. 5 shows another embodiment where n=9. It has the same number of measuring points as in FIG. 4, but the relative position of the points through which each radiation beam passes are different. That is, combinations of the points in FIG. 4 are $x_1$ with $x_2$, $x_2$ with $x_3$, $x_3$ with $x_4$, $x_4$ with $x_5$, and so on; however, in FIG. 5, the combinations are $x_1$ with $x_4$, $x_2$ with $x_5$, $x_3$ with $x_6$, $x_4$ with $x_7$, and so on. In the embodiment of FIG. 5, simultaneous equations yielding the wall thicknesses are represented by $$\begin{pmatrix} 1 & 0 & 0 & 1 & 0 & 0 & 0 & 0 & 0 \\ 0 & 1 & 0 & 0 & 1 & 0 & 0 & 0 & 0 \\ 0 & 0 & 1 & 0 & 0 & 1 & 0 & 0 & 0 \\ 0 & 0 & 0 & 1 & 0 & 0 & 1 & 0 & 0 \\ 0 & 0 & 0 & 0 & 1 & 0 & 0 & 1 & 0 \\ 0 & 0 & 0 & 0 & 0 & 1 & 0 & 0 & 1 \\ 1 & 0 & 0 & 0 & 0 & 0 & 1 & 0 & 0 \\ 0 & 1 & 0 & 0 & 0 & 0 & 0 & 1 & 0 \\ 0 & 0 & 1 & 0 & 0 & 0 & 0 & 0 & 1 \end{pmatrix} \begin{pmatrix} x_1 \\ x_2 \\ x_3 \\ x_4 \\ x_5 \\ x_6 \\ x_7 \\ x_8 \\ x_9 \end{pmatrix} = \begin{pmatrix} b_1 \\ b_2 \\ b_3 \\ b_4 \\ b_5 \\ b_6 \\ b_7 \\ b_8 \\ b_9 \end{pmatrix} \quad (9)$$

The above representation (9) can be rewritten as follows:

$$\begin{pmatrix} 1 & 1 & 0 \\ 0 & 1 & 1 \\ 1 & 0 & 1 \end{pmatrix} \begin{pmatrix} x_1 \\ x_4 \\ x_7 \end{pmatrix} = \begin{pmatrix} b_1 \\ b_4 \\ b_7 \end{pmatrix} \quad (10)$$

$$\begin{pmatrix} 1 & 1 & 0 \\ 0 & 1 & 1 \\ 1 & 0 & 1 \end{pmatrix} \begin{pmatrix} x_2 \\ x_5 \\ x_8 \end{pmatrix} = \begin{pmatrix} b_2 \\ b_5 \\ b_8 \end{pmatrix}$$

$$\begin{pmatrix} 1 & 1 & 0 \\ 0 & 1 & 1 \\ 1 & 0 & 1 \end{pmatrix} \begin{pmatrix} x_3 \\ x_6 \\ x_9 \end{pmatrix} = \begin{pmatrix} b_3 \\ b_6 \\ b_9 \end{pmatrix}$$

The representation (10) indicates that the embodiment of FIG. 5 is quite identical to performing the calculations for the embodiment of FIG. 3 three times.

FIG. 6 shows yet another embodiment where n=9. Here, the combinations of the points through which the radiation beam passes are $x_1$ with $x_6$, $x_2$ with $x_7$, $x_3$ with $x_8$, $x_4$ with $x_9$, and so on.

In the embodiment of FIG. 6, the simultaneous equations for the wall thicknesses are represented by:

$$\begin{pmatrix} 1 & 0 & 0 & 0 & 0 & 1 & 0 & 0 & 0 \\ 0 & 1 & 0 & 0 & 0 & 0 & 1 & 0 & 0 \\ 0 & 0 & 1 & 0 & 0 & 0 & 0 & 1 & 0 \\ 0 & 0 & 0 & 1 & 0 & 0 & 0 & 0 & 1 \\ 1 & 0 & 0 & 0 & 1 & 0 & 0 & 0 & 0 \\ 0 & 1 & 0 & 0 & 0 & 1 & 0 & 0 & 0 \\ 0 & 0 & 1 & 0 & 0 & 0 & 1 & 0 & 0 \\ 0 & 0 & 0 & 1 & 0 & 0 & 0 & 1 & 0 \\ 0 & 0 & 0 & 0 & 1 & 0 & 0 & 0 & 1 \end{pmatrix} \begin{pmatrix} x_1 \\ x_2 \\ x_3 \\ x_4 \\ x_5 \\ x_6 \\ x_7 \\ x_8 \\ x_9 \end{pmatrix} = \begin{pmatrix} b_1 \\ b_2 \\ b_3 \\ b_4 \\ b_5 \\ b_6 \\ b_7 \\ b_8 \\ b_9 \end{pmatrix} \quad (11)$$

As found in conjunction with FIGS. 4 through 6, several different simultaneous equations may be applied to measure the wall thicknesses at the passage points. By obtaining the values of the thicknesses in different combinations of points, an average of the measured values of the thickness at each measuring point can then be taken. This yields a better expected value of the wall thickness at each measuring point.

The expected value is given as follows, for example, for the thickness of the measuring point of $x_1$, where three different combinational modes of measurement are used to produce the three measured values $x_{11}$, $x_{12}$, and $x_{13}$, $$x_{1e} = (\tfrac{1}{3})(x_{11} + x_{12} + x_{13}) \quad (12)$$

where $x_{1e}$ denotes the expected value. This is the averaging method.

In general, statistical errors in radiation thickness measurement decrease as the wall thickness decreases. Therefor, in some cases, it is better to determine the expected value from a weighted average of the measured values. That is:

$$x_{1e} = \frac{1}{p_1 + p_2 + p_3}(p_1 x_{11} + p_2 x_{12} + p_3 x_{13}) \quad (13)$$

where $p_1$, $p_2$ and $p_3$ are weighting factors.

Further, if an abundant number of sets of the systems of radiation source and detector can be used, the method of least squares can be applied to treat the measured values.

Figure 7:
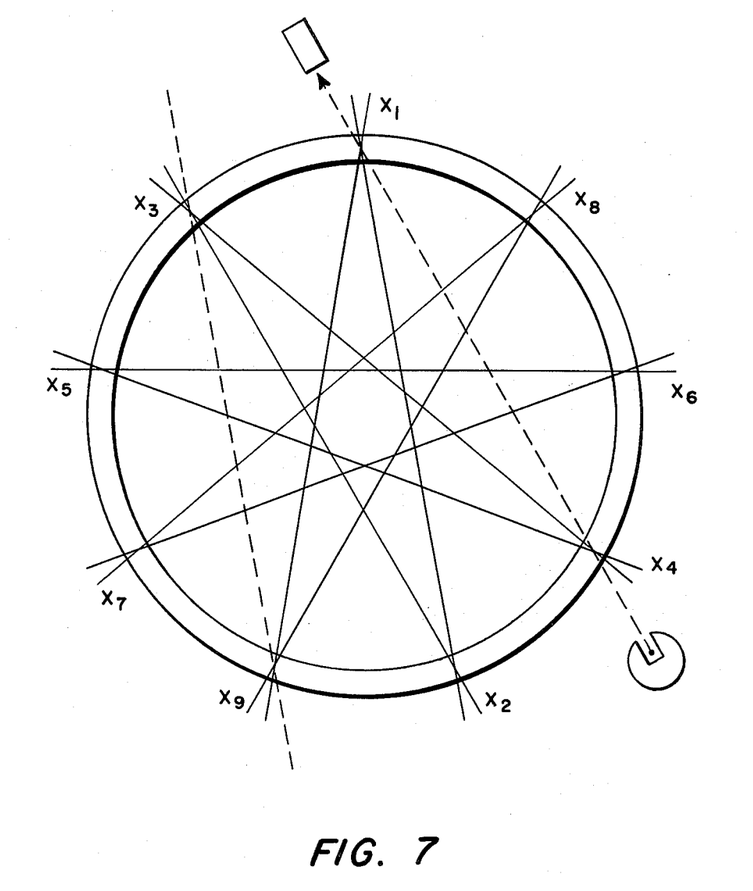
FIG. 7 is a schematic illustration of an embodiment of the invention, showing the application of method of least squares.

FIG. 7 is a schematic illustration of an embodiment having nine measuring points, where the method of least squares is employed for processing the data. If the number of solid lines each of which crosses two of the measuring points, the simultaneous equations for the thicknesses $x_1$ to $x_9$ are represented by Eq. (8), as mentioned in reference to FIG. 4. If two more sets of the measuring systems are added, the simultaneous equations to give the thicknesses are represented by Eq. (14) below.

$$\begin{pmatrix} 1 & 1 & 0 & 0 & 0 & 0 & 0 & 0 & 0 \\ 0 & 1 & 1 & 0 & 0 & 0 & 0 & 0 & 0 \\ 0 & 0 & 1 & 1 & 0 & 0 & 0 & 0 & 0 \\ 0 & 0 & 0 & 1 & 1 & 0 & 0 & 0 & 0 \\ 0 & 0 & 0 & 0 & 1 & 1 & 0 & 0 & 0 \\ 0 & 0 & 0 & 0 & 0 & 1 & 1 & 0 & 0 \\ 0 & 0 & 0 & 0 & 0 & 0 & 1 & 1 & 0 \\ 0 & 0 & 0 & 0 & 0 & 0 & 0 & 1 & 1 \\ 1 & 0 & 0 & 0 & 0 & 0 & 0 & 0 & 1 \\ 1 & 0 & 0 & 1 & 0 & 0 & 0 & 0 & 0 \\ 0 & 0 & 1 & 0 & 0 & 0 & 0 & 0 & 1 \end{pmatrix} \begin{pmatrix} x_1 \\ x_2 \\ x_3 \\ x_4 \\ x_5 \\ x_6 \\ x_7 \\ x_8 \\ x_9 \end{pmatrix} = \begin{pmatrix} b_1 \\ b_2 \\ b_3 \\ b_4 \\ b_5 \\ b_6 \\ b_7 \\ b_8 \\ b_9 \\ b_{10} \\ b_{11} \end{pmatrix} \quad (14)$$

From Eq. (14), nine simultaneous equations referred to as Gauss' normal equation are obtained, and their solutions give the thicknesses calculated by the method of least square. For completeness, Gauss' normal equations, shown below, are represented by:

$$\begin{bmatrix} [\alpha\alpha] & [\alpha\beta] & [\alpha\gamma] & [\alpha\delta] & [\alpha\epsilon] & [\alpha\zeta] & [\alpha\eta] & [\alpha\theta] & [\alpha\tau] \\ [\beta\alpha] & [\beta\beta] & [\beta\gamma] & [\beta\delta] & [\beta\epsilon] & [\beta\zeta] & [\beta\eta] & [\beta\theta] & [\beta\tau] \\ [\gamma\alpha] & [\gamma\beta] & [\gamma\gamma] & [\gamma\delta] & [\gamma\epsilon] & [\gamma\zeta] & [\gamma\eta] & [\gamma\theta] & [\gamma\tau] \\ [\delta\alpha] & [\delta\beta] & [\delta\gamma] & [\delta\delta] & [\delta\epsilon] & [\delta\zeta] & [\delta\eta] & [\delta\theta] & [\delta\tau] \\ [\epsilon\alpha] & [\epsilon\beta] & [\epsilon\gamma] & [\epsilon\delta] & [\epsilon\epsilon] & [\epsilon\zeta] & [\epsilon\eta] & [\epsilon\theta] & [\epsilon\tau] \\ [\zeta\alpha] & [\zeta\beta] & [\zeta\gamma] & [\zeta\delta] & [\zeta\epsilon] & [\zeta\zeta] & [\zeta\eta] & [\zeta\theta] & [\zeta\tau] \\ [\eta\alpha] & [\eta\beta] & [\eta\gamma] & [\eta\delta] & [\eta\epsilon] & [\eta\zeta] & [\eta\eta] & [\eta\theta] & [\eta\tau] \\ [\theta\alpha] & [\theta\beta] & [\theta\gamma] & [\theta\delta] & [\theta\epsilon] & [\theta\zeta] & [\theta\eta] & [\theta\theta] & [\theta\tau] \\ [\tau\alpha] & [\tau\beta] & [\tau\gamma] & [\tau\delta] & [\tau\epsilon] & [\tau\zeta] & [\tau\eta] & [\tau\theta] & [\tau\tau] \end{bmatrix} \begin{bmatrix} x_1 \\ x_2 \\ x_3 \\ x_4 \\ x_5 \\ x_6 \\ x_7 \\ x_8 \\ x_9 \end{bmatrix} = \begin{bmatrix} [\alpha b] \\ [\beta b] \\ [\gamma b] \\ [\delta b] \\ [\epsilon b] \\ [\zeta b] \\ [\eta b] \\ [\theta b] \\ [\tau b] \end{bmatrix} \quad (15)$$

where $[\alpha\alpha]$, $[\alpha\beta]$, $[\alpha\gamma]$, ..., $[\alpha\tau]$, and $[\Delta b]$ are representations in Gauss' notation, to denote the values defined by Eq. (15″) (shown below) where the form of Eq. (15′) is used for Eq. (14).

$$\begin{bmatrix} \alpha_1 & \beta_1 & \gamma_1 & \delta_1 & \epsilon_1 & \zeta_1 & \eta_1 & \theta_1 & \tau_1 \\ \alpha_2 & \beta_2 & \gamma_2 & \delta_2 & \epsilon_2 & \zeta_2 & \eta_2 & \theta_2 & \tau_2 \\ \alpha_3 & \beta_3 & \gamma_3 & \delta_3 & \epsilon_3 & \zeta_3 & \eta_3 & \theta_3 & \tau_3 \\ \alpha_4 & \beta_4 & \gamma_4 & \delta_4 & \epsilon_4 & \zeta_4 & \eta_4 & \theta_4 & \tau_4 \\ \alpha_5 & \beta_5 & \gamma_5 & \delta_5 & \epsilon_5 & \zeta_5 & \eta_5 & \theta_5 & \tau_5 \\ \alpha_6 & \beta_6 & \gamma_6 & \delta_6 & \epsilon_6 & \zeta_6 & \eta_6 & \theta_6 & \tau_6 \\ \alpha_7 & \beta_7 & \gamma_7 & \delta_7 & \epsilon_7 & \zeta_7 & \eta_7 & \theta_7 & \tau_7 \\ \alpha_8 & \beta_8 & \gamma_8 & \delta_8 & \epsilon_8 & \zeta_8 & \eta_8 & \theta_8 & \tau_8 \\ \alpha_9 & \beta_9 & \gamma_9 & \delta_9 & \epsilon_9 & \zeta_9 & \eta_9 & \theta_9 & \tau_9 \\ \alpha_{10} & \beta_{10} & \gamma_{10} & \delta_{10} & \epsilon_{10} & \zeta_{10} & \eta_{10} & \theta_{10} & \tau_{10} \\ \alpha_{11} & \beta_{11} & \gamma_{11} & \delta_{11} & \epsilon_{11} & \zeta_{11} & \eta_{11} & \theta_{11} & \tau_{11} \end{bmatrix} \begin{bmatrix} x_1 \\ x_2 \\ x_3 \\ x_4 \\ x_5 \\ x_6 \\ x_7 \\ x_8 \\ x_9 \end{bmatrix} = \begin{bmatrix} b_1 \\ b_2 \\ b_3 \\ b_4 \\ b_5 \\ b_6 \\ b_7 \\ b_8 \\ b_9 \\ b_{10} \\ b_{11} \end{bmatrix} \quad (15')$$

$$\left.\begin{aligned} [\alpha\alpha] &= \alpha_1{}^2 + \alpha_2{}^2 + \ldots + \alpha_{11}^2 \\ [\alpha\beta] &= \alpha_1\beta_1 + \alpha_2\beta_2 + \ldots + \alpha_{11}\beta_{11} \\ [\alpha\gamma] &= \alpha_1\gamma_1 + \alpha_2\gamma_2 + \ldots + \alpha_{11}\gamma_{11} \\ &\vdots \\ [\alpha\tau] &= \alpha_1\tau_1 + \alpha_2\tau_2 + \ldots + \alpha_{11}\tau_{11} \\ [\alpha b] &= \alpha_1 b_1 + \alpha_2 b_2 + \ldots + \alpha_{11} b_{11} \end{aligned}\right\}$$

(15″)

-continued $$[\beta a] = \beta_1 \alpha_1 + \beta_2 \alpha_2 + \ldots + \beta_{11}\alpha_{11}$$
$$[\beta \beta] = \beta_1^2 + \beta_2^2 + \ldots + \beta_{11}^2$$
$$\vdots$$
$$[\beta \tau] = \beta_1 \tau_1 + \beta_2 \tau_2 + \ldots + \beta_{11}\tau_{11}$$
$$[\beta b] = \beta_1 b_1 + \beta_2 b_2 + \ldots + \beta_{11}b_{11}$$

The use of the method of least squares is not limited only to the above example of Equations (14) and (15), but is also applicable to other cases as in Equations (8), (9) and (11). Using $A_1$, $A_2$, and $A_3$ to represent respective matrices of coefficients in the left latera of Equations (8), (9) and (11), using $B_1$, $B_2$, and $B_3$ to represent respective single-column matrices of elements b in the right latera thereof, and using X to represent the single-column matrix of elements x, the following representation holds:

$$\begin{pmatrix} A_1 \\ A_2 \\ A_3 \end{pmatrix} \cdot X = \begin{pmatrix} B_1 \\ B_2 \\ B_3 \end{pmatrix} \tag{16}$$

From Eq. (16), Gauss' normal equations can be introduced similarly as Eq. (15), and their solutions give the thicknesses calculated in the method of least squares. It is also possible to use the same measuring system for twice or more times the number of measurement processes to calculate the results by the method of least squares.

If the method of least squares is applied to the embodiment shown in FIG. 7, there may be a similarity in accuracy among the measured values by the nine measuring systems shown by solid lines of FIG. 7, while the two measuring systems shown in broken lines may produce measured values having different accuracies, since the radiation incidence angles with respect to the tube wall or the radiation beam path length in the tube wall are different. It is preferable, therefore, to weight the measured values and thus equalize their accuracies, before attempting a calculation by the method of least squares.

A weighting coefficient p should be a value proportional to the inverse of the square of the standard deviation, in accordance with the general technique of the method of least squares. Thus, the coefficient p given by $$p = \frac{1}{\sigma_2^2} \cdot \frac{1}{\frac{1}{\sigma_1^2}} = \frac{\sigma_1^2}{\sigma_2^2} \tag{17}$$

where
$\sigma_1$ denotes the standard deviation in the measured values of the measuring systems shown by solid lines of FIG. 7, and $\sigma_2$ denotes the standard deviation therein of the systems shown by broken lines. The standard deviations depend on certain factors as the detected radiation beam intensity (i.e., the representation of the radiation beam path length across the tube wall) and the construction of the detection circuit. Before the measurement by the method of least squares, a test is conducted, to obtain the standard deviations from which the value of coefficient p is calculated, using Eq. (17). Applying the weighting coefficient p to Eq. (14), Eq. (18) is obtained as below, introducing the method of least squares with the measured values equalized in accuracy.

$$\begin{bmatrix} 1 & 1 & 0 & 0 & 0 & 0 & 0 & 0 & 0 \\ 0 & 1 & 1 & 0 & 0 & 0 & 0 & 0 & 0 \\ 0 & 0 & 1 & 1 & 0 & 0 & 0 & 0 & 0 \\ 0 & 0 & 0 & 1 & 1 & 0 & 0 & 0 & 0 \\ 0 & 0 & 0 & 0 & 1 & 1 & 0 & 0 & 0 \\ 0 & 0 & 0 & 0 & 0 & 1 & 1 & 0 & 0 \\ 0 & 0 & 0 & 0 & 0 & 0 & 1 & 1 & 0 \\ 0 & 0 & 0 & 0 & 0 & 0 & 0 & 1 & 1 \\ 1 & 0 & 0 & 0 & 0 & 0 & 0 & 0 & 1 \\ P & 0 & 0 & P & 0 & 0 & 0 & 0 & 0 \\ 0 & 0 & P & 0 & 0 & 0 & 0 & 0 & P \end{bmatrix} \begin{bmatrix} x_1 \\ x_2 \\ x_3 \\ x_4 \\ x_5 \\ x_6 \\ x_7 \\ x_8 \\ x_9 \end{bmatrix} = \begin{bmatrix} b_1 \\ b_2 \\ b_3 \\ b_4 \\ b_5 \\ b_6 \\ b_7 \\ b_8 \\ b_9 \\ pb_{10} \\ pb_{11} \end{bmatrix} \tag{18}$$

The above weighted method of least squares can be applied not only to the example as shown in Eq. (18), but also to any measurement having redundancy in the measuring systems. Eq. (18) illustrates only one example.

As shown above in the invention, the number n of measuring points on the tube wall perimeter may have any value (provided it is three or more), and the number of sets of the measuring systems used should be n or more. It is not always necessary that the measuring points divide the tube wall perimeter into equal parts. Any arrangement of the points is permissible, provided that every measuring point is passed by at least two radiation beams in different incidence directions. Then, the n sets of the measuring systems produce that number n of measured values, from which a set of simultaneous equations is obtained. Their solutions in turn give the wall thicknesses at the measuring points. Also, by using more than n sets of measuring systems to produce more than n of the measured values there, it is possible to apply the method of least squares for obtaining the thicknesses.

Figure 8:
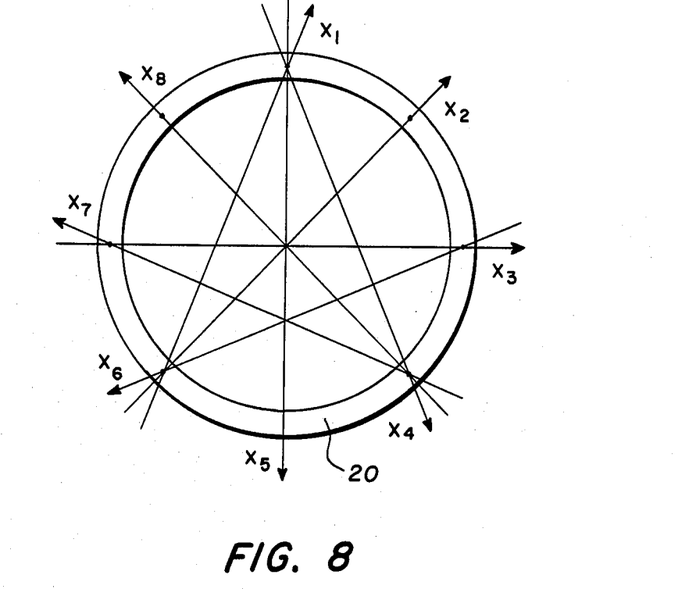
FIG. 8 is a schematic illustration of another embodiment of the invention, where n=8.

Further, the invention includes other embodiments where n is an even number not smaller than four. FIG. 8 shows one of such embodiments, where n=8. By choosing an adequate odd number m not smaller than 3 of the measuring points from the number n of the points (in FIG. 8, m=5), a set of simultaneous equations can be obtained, to give the wall thicknesses at those m points from the measured values of those points. Then, the wall thickness at any remaining measuring point can be given, by using a radiation beam which passes through that remaining measuring point and one of those m measuring points where the wall thickness has already been gauged. As in the previous embodiment, the method of least squares can be utilized for the processing of the measured intensities.

The method of least squares can be applied to the method described above as follows. In FIG. 8, $x_1$, $x_2$, . . . , $x_8$ denote the wall thicknesses at respective measuring points. Suppose that five of those points are chosen, and the wall thicknesses $x_1$, $x_3$, $x_4$, $x_6$ and $x_7$ are measured first. The simultaneous equations shown below can be obtained, similarly as in the embodiments described above.

$$x_1 + x_4 = \frac{1}{\mu k} \ln \frac{I_{10}}{I_1}$$

-continued $$x_4 + x_7 = \frac{1}{\mu k} \ln \frac{I_{20}}{I_2}$$

$$x_7 + x_3 = \frac{1}{\mu} \ln \frac{I_{30}}{I_3}$$

$$x_3 + x_6 = \frac{1}{\mu k} \ln \frac{I_{40}}{I_4}$$

$$x_6 + x_1 = \frac{1}{\mu k} \ln \frac{I_{50}}{I_5}$$

Here, the third equation has $1/\mu$ instead of $1/\mu k$ because $k=1$ for two of the measuring positions across the diameter of the tube wall circle, as previously explained.

From the above simultaneous equations, the solutions can be obtained as follows:

$$x_1 = \frac{1}{2}(b_1 - b_2 + b_3 - b_4 + b_5)$$

$$x_4 = \frac{1}{2}(b_2 - b_3 + b_4 - b_5 + b_1)$$

$$x_7 = \frac{1}{2}(b_3 - b_4 + b_5 - b_1 + b_2)$$

$$x_3 = \frac{1}{2}(b_4 - b_5 + b_1 - b_2 + b_3)$$

$$x_6 = \frac{1}{2}(b_5 - b_1 + b_2 - b_3 + b_4)$$

where $$b_1 = \frac{1}{\mu k} \ln \frac{I_{10}}{I_1}$$

$$b_2 = \frac{1}{\mu k} \ln \frac{I_{20}}{I_2}$$

$$b_3 = \frac{1}{\mu} \ln \frac{I_{30}}{I_3}$$

$$b_4 = \frac{1}{\mu k} \ln \frac{I_{40}}{I_4}$$

$$b_5 = \frac{1}{\mu k} \ln \frac{I_{50}}{I_5}$$

Thus the thicknesses remaining unknown are $x_5$, $x_8$ and $x_2$. Radiation beams are then used to pass $x_5$ with $x_1$, $x_8$ with $x_4$, and $x_2$ with $x_6$, respectively. The equation shown below can thus be obtained:

$$x_1 + x_5 = \frac{1}{\mu} \ln \frac{I_{60}}{I_6}$$

The value of $x_1$ is known, therefore, the value of $x_5$ can be determined. Similarly, $$x_4 + x_8 = \frac{1}{\mu} \ln \frac{I_{70}}{I_7}$$

$$x_6 + x_2 = \frac{1}{\mu} \ln \frac{I_{80}}{I_8}$$

and $x_4$ and $x_5$ are known. Thus, $x_8$ and $x_2$ can be found.

Figure 9:
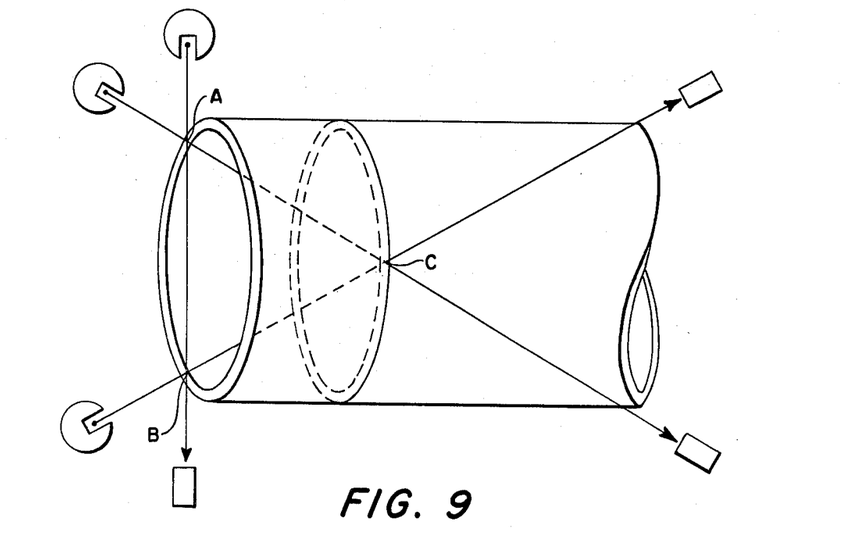
FIG. 9 is a schematic perspective view of a tube, showing another embodiment of the invention, where the measuring points are located on different planes.

In the invention, it is not required that all of the measuring points be placed on one sectional plane perpendicular to the axis of the tube. Those points may be distributed on some different planes such as shown in FIG. 9. In FIG. 9, measuring points A and B are on one plane perpendicular to the tube axis, but the other point C is on another.

As described above, the invention presents the improved method of tube wall thickness measurement in a non-touching manner using the radiation transmission, with high accuracy, having no moving parts, and is capable of rapid measurement.

By selecting adequate kinds of radiation and energy intensities, the invention can be applied to various tubular products of glass, plastics, rubber, paper, fiber and metals, and also, of course, to various hollow products having orderly sectional shapes other than tubes. It is also possible for the invention to use infrared, visible or ultraviolet light, X-ray, or various particle rays as the radiation. Further, if a computer is employed for processing the measured data, the invention can favorably realize a fairly rapid or perhaps in real-time measurement.

While there has been described what is believed to be the preferred embodiment of the invention, those skilled in the art will recognize that other and further modifications, may be made thereto without departing from the spirit of the invention, and it is intended to claim all such embodiments as fall within the true scope of the invention.

We claim:

1. A method of measuring values of single thickness of the wall of a tube having an axis comprising the steps of:

selecting at least four distinct measuring points within a sectional area of said tube wall, said sectional area being on a plane which is not parallel to the longitudinal axis of the tube;

selecting at least five radiation beam paths such that each of the paths passes through two of such measuring points and so that each of at least four measuring points is at an intersection of at least two different beam paths, so that at least two of said measuring points are on an intersection of more than two beam paths;

transmitting at least one radiation beam of known intensity along said paths;

detecting the intensities of said transmitted radiation beams, after having passed through said measuring points, to derive detected values each of which is indicative of a dual compound thickness of the tube wall;

processing said detected values to determine said radial thickness values of said wall, by solving a set of simultaneous equations so that at least two values of radial thickness are obtained for the particular measuring points having more than two measuring beam paths passing therethrough, and by mathematically obtaining the most probable value of solution for the radial thickness at each of those particular measuring points, wherein said most probable values of solution are used as the values of single radial thickness of the tube wall at said measuring points; and wherein the number of measuring points and arrangement of beam paths are selected so that said set of simultaneous equations are solvable.

2. A method of measuring the value of the thickness of a tube having an axis comprising the steps of:

selecting at least four distinct measuring points within a sectional area of said tube;

selecting at least five radiation beam paths such that each of the paths passes through two of said measuring points and so that each of at least four measuring points is at an intersection of at least two different beam paths, and so that at least two of said measuring points are on an intersection of more than two beam paths;

transmittng at least one radiation beam of known intensity along said paths;

detecting the intensities of said transmitted radiation beams after having passed through said measuring points, to obtain detected values each of which is indicative of a dual compound thickness of the tube wall; and processing said detected values to determine said thickness values of said wall, by solving a set of solvable simultaneous equations using equations of the type:

$$I_i = I_{io} \exp(-\mu k (x_i + x_j))$$

where $I_{io}$ is the initial beam intensity for a beam passing through measuring points i and j; where $I_i$ is the beam intensity after the beam passes through measuring points i and j; where $\mu$ is the absorption coefficient of radiation of the tube material; and where k is a value generally equal to the ratio of s, the actual oblique transit path length at the measuring point i, to x, the nominal radial wall thickness; and so that at least two values of radial thickness are obtained for the particular measuring points having more than two measuring beam paths passing therethrough, and by mathematically obtaining the most probable value of solution for the radial thickness at each of those particular measuring points, wherein said most probable values of solution are used as the values of single radial thickness of the tube wall at said measuring points.

3. A method as set forth in claim 1 or 2 wherein the most probable value of radial thickness at each particular measuring point is obtained by averaging the values obtained at that particular measuring point.

4. A method as set forth in claim 1 or 2 wherein the most probable value of radial thickness at each particular measuring point is obtained by assigning relative weights to each value obtained, and then by averaging the weighted values.

5. A method as set forth in claim 1 or 2 wherein the most probable value of radial thickness at each particular measuring point is obtained by using the method of least squares.

6. An apparatus for measuring values of single thickness of the wall of a tube having an axis, comprising:

beam generation means for generating a beam of known intensity along at least five beam paths having unique radiation directions, said paths being selected and oriented such that each of said beam paths intersects at least two other beam paths at two different points within the cross-section of said tube wall, wherein each of at least four measuring points is at an intersection of at least two different beam paths and wherein said cross-section is in a plane which is not parallel to the longitudinal axis of the tube so that at least two of said measuring points are on an intersection of more than two beam paths;

beam intensity detection means for detecting the radiation in each of said radiation paths beyond said tube and for producing a detected value of beam intensity indicative of a dual compound thickness of the tube wall;

processing means for determining said tube wall thickness values from said known intensity values and said detected values of beam intensity of solving a set of simultaneous equations so that at least two values of radial thickness for the particular measuring points which have more than two measuring beam paths pass therethrough are obtained, and so that the most probable value of solution for the radial thickness at each of those particular measuring points is mathematically obtained, and said most probable values of solution are used as the values of single radial thickness of the tube wall at said measuring points; and wherein the number of measuring points and arrangement of beam paths is such that said set of simultaneous equations is solvable.

7. An apparatus for measuring the value of the thickness of a tube having an axis comprising:

beam generation means for generating a beam of known intensity along at least five beam paths having unique radiation directions, said paths being selected and oriented such that each of said beam paths intersects at least two other beam paths at two different measuring points within the cross-section of said tube wall, wherein each of at least four measuring points is at an intersection of at least two different beam paths and so that at least two of said measuring points are on an intersection of more than two beam paths;

beam intensity detection means for detecting the radiation in each of said radiation paths beyond said tube and for producing a detected value of beam intensity indicative of a dual compound thickness of the tube wall; and processing means for determining said tube wall thickness values from said known intensity values by solving a set of solvable simultaneous equations using equations of the type:

$$I_i = I_{io} \exp(-\mu k (x_i + x_j))$$

where $I_{io}$ is the initial beam intensity for a beam passing through measuring points i and j; where $I_i$ is the beam intensity after the beam passes through measuring points i and j; where $\mu$ is the absorption coefficient of radiation of the tube material; and where k is a value generally equal to the ratio of s, the actual oblique transit path length at the measuring point i, to x, the nominal radial wall thickness; and wherein at least two values of radial thickness for the particular measuring points which have more than two measuring beam paths pass therethrough are obtained and wherein the most probable value of solution for the radial thickness at each of those particular measuring points is mathematically obtained, and said most probable values of solution are used as the values of single radial thickness of the tube wall at said measuring points.

8. An apparatus as set forth in claim 6 or 7 wherein the processing means obtains the most probable value of radial thickness at each particular measuring point by averaging the values obtained at that particular measuring point.

9. An apparatus as set forth in claim 6 or 7 wherein the processing means obtains the most probable value of radial thickness at each particular measuring point by assigning relative weights to each value obtained, and then by averaging the weighted values.

10. An apparatus as set forth in claim 6 or 7 wherein the processing means obtains the most probable value of radial thickness at each particular measuring point by using the method of least squares.

* * * * *